United States Patent
Rangarajan et al.

(10) Patent No.: US 11,403,574 B1
(45) Date of Patent: Aug. 2, 2022

(54) METHOD AND SYSTEM FOR OPTIMIZING AN ITEM ASSORTMENT

(71) Applicant: Target Brands, Inc., Minneapolis, MN (US)

(72) Inventors: Bharath Rangarajan, Minneapolis, MN (US); Elif Tokar-Erdemir, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 117 days.

(21) Appl. No.: 16/460,737

(22) Filed: Jul. 2, 2019

Related U.S. Application Data

(60) Provisional application No. 62/692,953, filed on Jul. 2, 2018.

(51) Int. Cl.
| | |
|---|---|
| *G06Q 10/00* | (2012.01) |
| *G06Q 10/06* | (2012.01) |
| *G06Q 30/02* | (2012.01) |
| *G06Q 10/08* | (2012.01) |
| *G06Q 10/04* | (2012.01) |

(52) U.S. Cl.
CPC ....... *G06Q 10/06315* (2013.01); *G06Q 10/04* (2013.01); *G06Q 10/087* (2013.01); *G06Q 30/02* (2013.01); *G06Q 30/0201* (2013.01); *G06Q 30/0202* (2013.01)

(58) Field of Classification Search
CPC ......... G06Q 10/06315; G06Q 30/0202; G06Q 10/04; G06Q 10/087; G06Q 30/02; G06Q 30/0201

USPC ....................................................... 705/725
See application file for complete search history.

(56) References Cited

U.S. PATENT DOCUMENTS

| | | | |
|---|---|---|---|
| 6,341,269 B1* | 1/2002 | Dulaney | G06Q 10/087 705/22 |
| 6,366,890 B1 | 4/2002 | Usrey | |
| 7,058,587 B1* | 6/2006 | Horne | G06Q 10/06 705/7.22 |
| 8,417,559 B2 | 4/2013 | Joshi et al. | |
| 2001/0047293 A1* | 11/2001 | Waller | G06Q 20/203 705/22 |
| 2005/0114196 A1* | 5/2005 | Schoenmeyr | G06Q 30/0201 705/7.29 |
| 2005/0216371 A1* | 9/2005 | Fotteler | G06Q 30/06 705/28 |
| 2006/0235734 A1* | 10/2006 | Dale | G06Q 30/0202 705/7.29 |
| 2008/0208719 A1* | 8/2008 | Sharma | G06Q 10/00 705/29 |
| 2009/0271245 A1* | 10/2009 | Joshi | G06Q 30/02 705/7.31 |

(Continued)

*Primary Examiner* — Rutao Wu
*Assistant Examiner* — Tyrone E Singletary
(74) *Attorney, Agent, or Firm* — Merchant & Gould P.C.

(57) ABSTRACT

Methods and systems for optimizing item assortments are disclosed. One method includes receiving a request for an optimized assortment. Data relating to items within a selected initial item assortment and item universe is accessed. Constraints are applied to the items in the assortment to arrive at an optimized item assortment. Constraints include goals for optimization, lock in and lock out rules, and item attribute rules. The method may be performed by a system including one or more computing devices communicating via a network with one or more data storage devices.

21 Claims, 12 Drawing Sheets

(56) References Cited

U.S. PATENT DOCUMENTS

| | | | |
|---|---|---|---|
| 2011/0238459 A1* | 9/2011 | Bottom | G06Q 30/02 |
| | | | 705/7.29 |
| 2011/0276364 A1 | 11/2011 | Bergstrom et al. | |
| 2012/0123814 A1* | 5/2012 | Bottom | G06Q 10/04 |
| | | | 705/7.11 |
| 2014/0025420 A1 | 1/2014 | Joshi et al. | |
| 2014/0136271 A1* | 5/2014 | Rangarajan | G06Q 10/04 |
| | | | 705/7.25 |
| 2015/0112762 A1* | 4/2015 | Lahmar | G06Q 30/0202 |
| | | | 705/7.31 |
| 2016/0210640 A1* | 7/2016 | Wu | G06Q 30/0202 |
| 2017/0200104 A1* | 7/2017 | Kannan | G06Q 30/0235 |
| 2019/0180301 A1* | 6/2019 | Mahalanobish | H04W 4/35 |
| 2020/0034781 A1* | 1/2020 | Sewak | G06Q 10/067 |
| 2020/0342475 A1* | 10/2020 | Wu | G06Q 30/0202 |

* cited by examiner

600 — Choose store and item assortment to add rules to:

[ Store #4367 Grocery Items ▽ ]

[ Grocery Items ▽ ]

Choose store and item assortment to add rules to:

[ Lock In WIC Items ▽ ]

[ Select Lock Out Items ▽ ]

Choose category rules based on item attributes

610 — [ Store-owned Brand ▽ ]   [ 10% ] — 612

614 — [ Initial Item Assortment ▽ ]   [ 70% ] — 616

618 — [ Choose attribute ▽ ]   [ % goal ] — 620

Choose optimization goal as a function of Margin versus Sales

622 — [ Margin ———————|—— Sales ]   ( 80% sales / 20% margin ) — 624

[ SUBMIT ]

FIG. 7

METHOD AND SYSTEM FOR OPTIMIZING AN ITEM ASSORTMENT

CROSS-REFERENCE TO RELATED APPLICATIONS

The present application claims priority from U.S. Provisional Patent Application No. 62/692,953, filed on Jul. 2, 2018, the disclosure of which is hereby incorporated by reference in its entirety.

TECHNICAL FIELD

The present disclosure relates generally to methods and systems for managing item assortments. More particularly, the present disclosure describes determining an optimized assortment of items for a particular space.

BACKGROUND

In various contexts, item assortments are selected in which various items can be presented to a consumer or population of consumers. The items in an item assortment are often selected to maximize the likelihood that any consumer viewing the item assortment will find a satisfactory item to select within a particular available space. This can be applied in various contexts in which a limited assortment of items is to be presented to a population of consumers for purposes of consumer choice. For example, item assortments can be found in retail environments, in the context of consumer or financial products, business-to-business sales, etc. In retail and other sales contexts, the item assortment is often selected with the goal of increasing profits and sales.

In such scenarios, there can be limitations with respect to the items that are included in such an item assortment. For example, in an online retail offering, a particular item assortment may be limited in terms of the numbers and types of items that are offered, because of a limit regarding practical storage space of either physical items or storage of data regarding the item in memory. Furthermore, for digital products, the storage space to hold a large number of digital items (e.g., digital content, such as movies, music, or other multimedia content) might be substantial as well. In a physical item assortment, particularly in a retail environment, the space requirements issue is exacerbated, because both an electronic record and physical inventory must be stored. Because of possible physical and electronic storage limitations, there is a practical limit to a number of items that can be included in such an item assortment.

Entities wishing to develop an item assortment will typically attempt to maximize the extent to which the item assortment includes an item that is "in demand" by a user. The goal of the item assortment is generally to increase profits by maximizing sales of items. Accordingly, two items that are very similar to each other might not be maintained in the same item assortment if it can be determined that, from the perspective of potential users, those items are considered substantially interchangeable, or substitutes, of one another. Therefore, one of the two items might be able to be removed from an item assortment without substantially changing the extent to which users will find a satisfactory item within the item assortment (i.e., the remaining item being considered substitutable for the removed item). However, even if two items are interchangeable, both might remain in an item assortment if it is determined that sales of those items are high or that profits on those items are high.

Item assortments may have other restrictions placed on them in addition to limited space. Laws of and regulations for the jurisdiction in which the item assortment is held may dictate that certain items must be included or excluded. For example, in certain retail stores, items deemed hazardous must not be available for sale. Other limitations on the item assortment may be dictated by the entity managing the item assortment. Such limitations may include preventing the item assortment from changing too much at one time. Other limitations may be in place due to contractual obligations requiring a retail entity to sell or not sell particular items.

Optimizing, or improving, an item assortment can be made more difficult because items may change over time, may become unavailable, or new items may become available that represent a better fit within an overall item assortment. Accordingly, managing an item assortment is an ongoing process in which improvements are continually sought, and a static model is generally unsatisfactory. Retail entities need a way to optimize item assortments while maintaining control over particular parameters or the item assortment that is being offered for sale.

SUMMARY

In summary, the present disclosure relates to methods and systems for optimizing an item assortment to increase profit and sales while adhering to user specified constraints. Such constraints include specifying the number of items that can be substituted during optimization, locking in particular items, locking out particular items, and specifying that a particular percentage of the assortment has a particular attribute. Inputs such as demand transfer, demand forecasting, purchase repeat scores, and item attributes are used to calculate the optimal assortment of items. Various aspects are described in this disclosure, which include, but are not limited to, the following aspects.

In one aspect, a system for optimizing an assortment of items is disclosed. The system includes a computing system comprising an assortment optimization application stored in memory and executable thereon. The assortment optimization application causes the computing system, when executed, to receive a request from a user computing device, the request defining a current assortment for at least one store; based on the request, obtain item information, demand forecast information, and demand transferability information via one or more application programming interfaces; and apply at least one optimization analysis to the assortment to generate an optimized assortment, the at least one optimization analysis including one or more of: maximizing a number of sales dollars per week; determining additional demand transfer dollars per week for items not included in the current assortment; and applying one or more lock-in or lock-out rules. The application further returns an optimized assortment to the user computing device.

In another aspect, a method of optimizing an assortment of items is disclosed. The method includes receiving a request from a user computing device, the request defining a current assortment for at least one store, and, based on the request, obtaining item information, demand forecast information, and demand transferability information via one or more application programming interfaces. The method includes applying at least one optimization analysis to the assortment to generate an optimized assortment, the at least one optimization analysis including one or more of: maximizing a number of sales dollars per week; determining additional demand transfer dollars per week for items not included in the current assortment; and applying one or more lock-in or lock-out rules. The method further includes returning an optimized assortment to the user computing device.

In a still further aspect, a system for optimizing an assortment of items includes a computing system comprising an assortment optimization application stored in memory and executable thereon. The assortment optimization application causes the computing system, when executed, to: receive a request from a user computing device remote from the computing system, the request defining a current assortment of items offered for sale and associated with at least one store, and, based on the request, obtain item information, demand forecast information, and demand transferability information specific to the at least one store for each of the items included in the current assortment via one or more application programming interfaces. The assortment optimization application causes the computing system to apply at least one optimization analysis to the assortment to generate an optimized assortment, the at least one optimization analysis including applying a plurality of constraining rules including: maximizing a number of sales dollars per week; determining additional demand transfer dollars per week for items not included in the current assortment; and applying one or more rules including lock-in or lock-out rules. The assortment optimization application causes the computing system toreturn the optimized assortment to the user computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 7 illustrates another view of the user interface of FIG. 6 useable to implement the method of FIG. 5;

DETAILED DESCRIPTION

Figure 1:
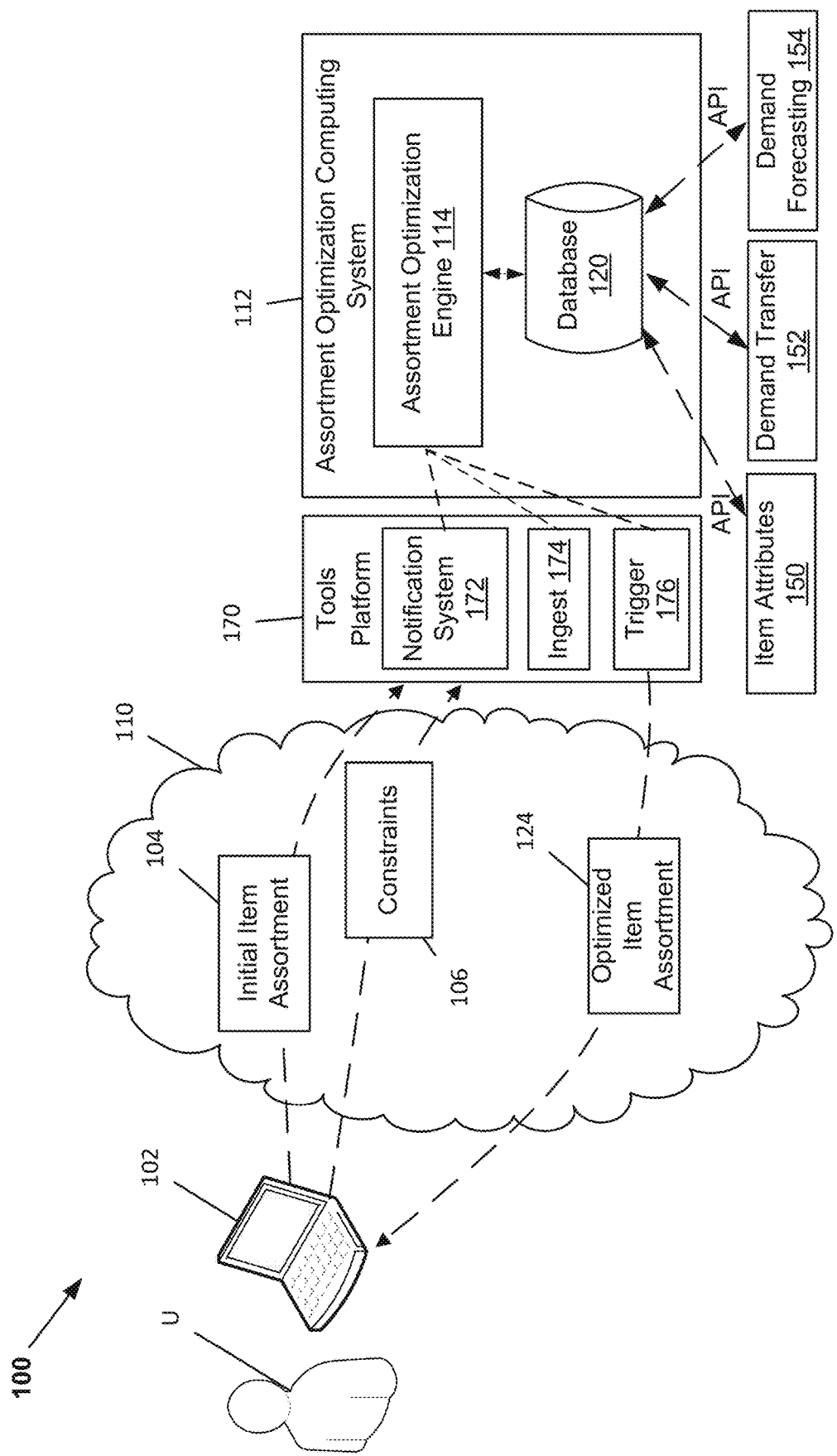
FIG. 1 illustrates a diagram of an example network and system in which an item assortment can be optimized.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for managing an item assortment in order to optimize sales and profits. An initial item assortment is received along with parameters for optimizing the assortment. Item data is accessed relating to the items' attributes, demand forecasting, demand transfer, and customer repeat scores. Items within the initial assortment are substituted with other items from an item universe in order to achieve an assortment that has increased sales and profit potential. The parameters restrict the substitutions that can be made.

The item assortment can be for an entire retail establishment or for particular categories of items within a retail establishment. For example, groceries could be a category of items within a retail store. In other examples, the retail store only carries groceries, so the item assortment is for all items within that store. In some examples, the item assortment may be a subgroup of items and the category can be more specific. Using the grocery example, the item assortment could be for all dairy products, for just cheese products, or specifically for just shredded cheese products. It is recognized that a variety of different product collections or product segments could be addressed by the item assortment systems described herein.

In some embodiments, one item assortment may apply to multiple retail stores. In some embodiments, the retail entity is an online marketplace and may only need one assortment of items. In other embodiments, the retail entity is an online marketplace, but must have varying assortments depending on where the customers reside.

The item assortment is optimized by substituting, adding, or subtracting items. Substitutions and additions are made from a chosen item universe. Using the grocery example, the item universe could be all grocery products that a retail store could stock. Or if the item assortment is for a more specific category of items, the item universe could be all cheese that the retail store could carry. If the retail entity is an online retailer, the item universe may consist of all available items in the retailer's warehouse or items that are obtainable by the retailer to sell online. The user may input an item universe or may select from a pre-populated list.

In certain aspects of the present disclosure, item assortments can be classified in a variety of ways. One possible classification system places items into different categories. Categories may be defined at different levels of catalog hierarchy such as department, class, and subclass, in the case of a retail environment. The breadth, depth and composition of the product assortment are chosen to maximize a particular outcome associated with demand for specific items within a collection. For example, in a retail environment, revenue or gross margin might be maximized, while taking into account constraints such as a fixed financial budget, limited shelf space for displaying products, number of vendors needed for each product type, customer preferences and additional objectives such as having a certain percentage of assortment as product types. Such retailers might periodically review their assortment and make changes based on seasonality, trends, new item arrival, consumer tastes, local demographics and competition.

Given the complex nature of assortment planning, entities presenting item assortments, in particular in the retail environment, face fundamental tradeoffs between breadth and depth. In addition, tradeoffs between existing and new, seasonal and non-seasonal, local and national products also need to be addressed, and may change over time. The present disclosure presents a data-driven approach to optimizing item assortments based on analysis of transaction data as well as item attribute data, and determining an optimal assortment of items to present to consumers while staying within specified parameters.

In accordance with the present disclosure, and as reflected in the embodiments below, the present assortment optimization system has a number of technical advantages over existing systems as well as the efficiency advantages described above. In particular, the systems and methods of the present disclosure include an assortment optimization engine that integrates management of item demand considerations with constraints that may run counter to item demand, such that the models may perform a complex multivariate analysis that is not present in current assortment optimization systems, which typically ignore such requirements or constraints (e.g., a constraint to carry a particular type of product to comply with a government or community program or request or requirement). Furthermore, the present system incorporates an automated feedback data flow that returns to an assortment optimization engine changes in item assortment and associated performance, so the assortment optimization engine can iteratively improve item assortments output based on changes to a variety of items concurrently, including observations in the form of item assortment performance, but also in combination with sales forecasts, demand transferability analysis, and updated item availability information.

Referring first to FIG. 1, a diagram of an example system 100 in which an item assortment can be optimized is illustrated. In the example shown, a computing device 102 operated by a user U communicates an initial item assortment 104 and a set of constraints 106 to the computing system 112 through a network 110. The computing system 112 includes at least an assortment optimization engine 114 and accesses data from one or more databases 120, 122. The assortment optimization engine 114 determines an optimized item assortment based on the initial item assortment 104, constraints 106, and item data received from the databases 120, 122. The optimized item assortment 114 is communicated from the computing system 112 to the computing device 102 through the network 110.

In the example shown, a tools platform 170 provides an interface between the computing device 102 and computing system 112, and passes messages therebetween via network 110. The tools platform 170 mediates messages passed to the computing system 112 such that many computing devices 102 can transmit requests to and receive data from the computing system 112 concurrently. As shown, the tools platform 170 includes a notification system 172, an ingest service 174, and a trigger 176, each of which are described below.

The computing device 102 operates to present a user interface to a user U. The user U provides inputs to the computing device 102 by use of a mouse, a keyboard, a touchscreen, and the like to make selections. The selections include at least selecting an initial item assortment 104 and one or more constraints 106 to apply to the item assortment 104. Additional selections include choosing an item universe and desired priority for applying constraints to the optimization. One example of a user interface is further described with respect to FIGS. 6 and 7, and can be generated using the computing device 102, the computing system 112, or a combination thereof. The computing device 102 also receives the optimized item assortment 124 and can display it for the user U. In some embodiments, the optimized item assortment 124 is output in a format useable for downstream functions such as planogram planning. An example of the computing device 102 is further described with respect to FIG. 2.

In the embodiment shown, the initial item assortment 104 and constraints 106 are communicated to the computing system 112 through the network 110. The network 110 can be any of a variety of types of public or private communications networks, such as, for example, the internet. In some embodiments, a computation trigger microservice, shown as trigger 176, is utilized to communicate requests from the user U to the computing system 112. In example embodiments, the computation trigger microservice is an application developed to allow configuring and triggering workflows in Apache Oozie through a common hypertext transfer protocol ("HTTP") and JavaScript Object Notation (JSON)-based interface. Data from user-generated HTTP requests is used to make calls to the assortment optimization engine 114 for executing a workflow with the required configuration for the request.

After the assortment optimization engine 114 has determined an optimized item assortment 124, the optimized item assortment 124 is communicated back to the computing device 102 through the network 110. In some embodiments, a notification system 172 is utilized to communicate the status and results of the assortment optimization process. An ingest service 174, implemented as a Kafka topic within Apache Kafka, provides updates on the state changes of the workflow being executed by the assortment optimization engine 114. Computations will push notifications to this topic as the last step of a workflow, indicating the successful or failed completion of execution.

The computing system 112 includes an assortment optimization engine 114. The assortment optimization engine 114 receives the initial item assortment 104 and constraints 106 from the computing device 102. The assortment optimization engine 114 also accesses data from one or more databases 120. The data includes item data such as item attributes, demand forecasting data, demand transfer data for pairs of items, and repeat purchase data. The databases 120 may be external to the computing system 112 as shown, or may be housed within the computing system 112. The assortment optimization engine 114 operates to calculate and determine an optimized item assortment 124 based on the constraints and item attributes of the assortment. The optimized item assortment 124 is output and communicated back to the computing device 102 through the network 110. The computing system 112 is further described with respect to FIG. 3.

In the embodiment shown, data is received at the database 120 via one or more Application Programming Interfaces ("APIs") connected to external services. As shown, the APIs expose services including an item attributes service 150, a demand forecasting service 152, and a demand transfer service 154. The item attributes service 150 supplies information regarding items available to be included in an assortment, including name, cost, SKU, and various other properties. The demand forecasting service 152 provides, in response to an identification of an item, a location, and a time period, a forecasted demand for that item at the particular location for that time period (e.g., for a particular store over a period of time). The demand transfer service 154 provides information regarding transferability of item demand across pairs or groups of items. An example of a demand transfer service 154 is described in copending U.S.

patent application Ser. No. 15/582,244, filed on Apr. 28, 2017, the disclosure of which is hereby incorporated by reference in its entirety.

Figure 2:
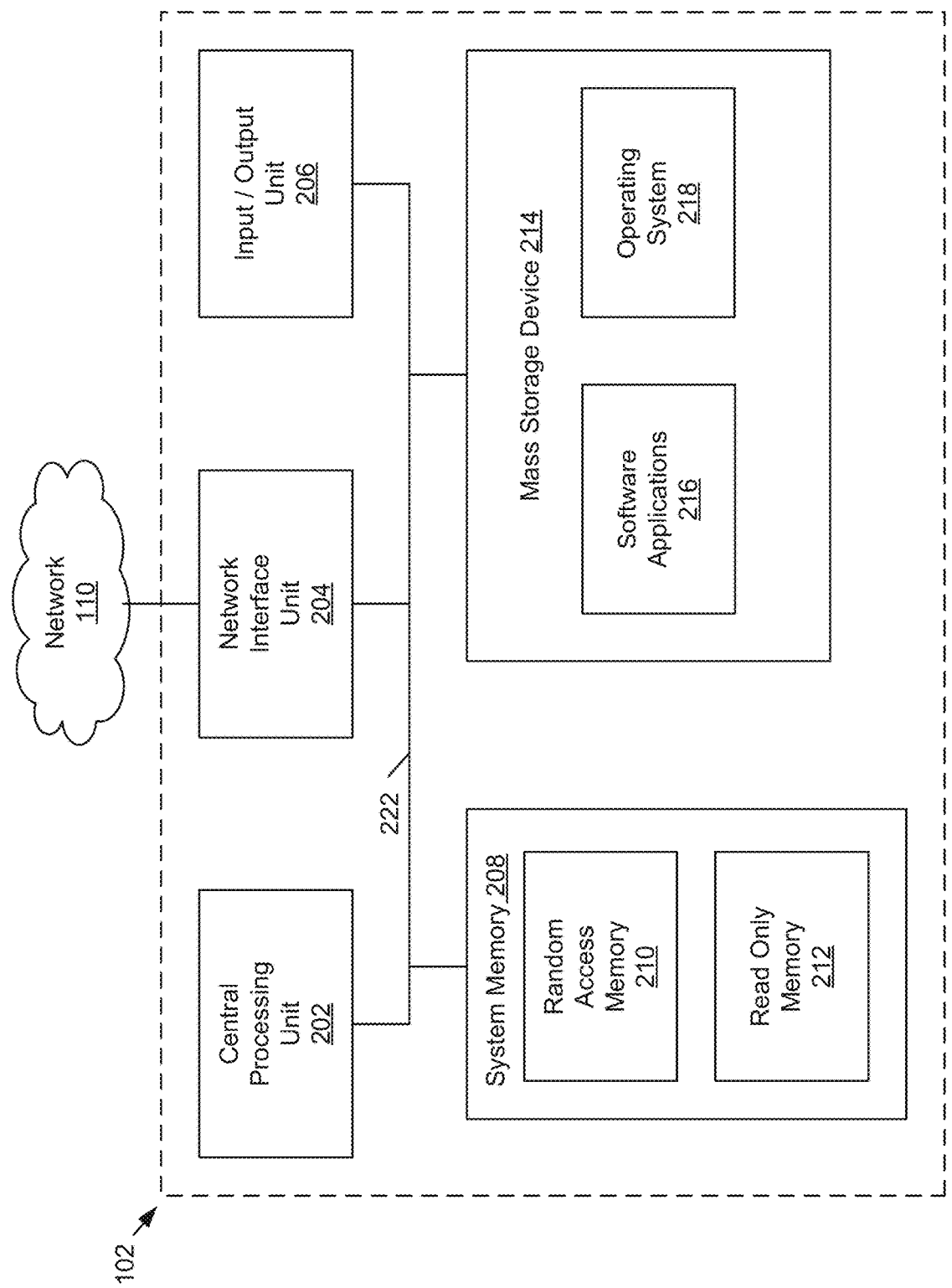
FIG. 2 illustrates an example block diagram of a computing device useable in the context of FIG. 1.

Referring now to FIG. 2, an example block diagram of a computing device 102 is shown that is useable to implement aspects of the system 100 of FIG. 1. In the embodiment shown, the computing device 102 includes at least one central processing unit ("CPU") 202, a system memory 208, and a system bus 222 that couples the system memory 208 to the CPU 20 The system memory 208 includes a random access memory ("RAM") 210 and a read-only memory ("ROM") 212. A basic input/output system that contains the basic routines that help to transfer information between elements within the computing device 102, such as during startup, is stored in the ROM 212. The computing device 102 further includes a mass storage device 214. The mass storage device 214 is able to store software instructions and data.

The mass storage device 214 is connected to the CPU 202 through a mass storage controller (not shown) connected to the system bus 222. The mass storage device 214 and its associated computer-readable storage media provide non-volatile, non-transitory data storage for the computing device 102. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 202 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 102.

According to various embodiments of the invention, the computing device 102 may operate in a networked environment using logical connections to remote network devices through a network 110, such as a wireless network, the Internet, or another type of network. The computing device 102 may connect to the network 110 through a network interface unit 204 connected to the system bus 222. It should be appreciated that the network interface unit 204 may also be utilized to connect to other types of networks and remote computing systems. The computing device 102 also includes an input/output controller 206 for receiving and processing input from a number of other devices, including a touch user interface display screen, or another type of input device. Similarly, the input/output controller 206 may provide output to a touch user interface display screen or other type of output device.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software instructions, that when executed by the CPU 202, cause the computing device 102 to provide the functionality of the computing system 200 discussed in this document. For example, the mass storage device 214 and/or the RAM 210 can store software instructions that, when executed by the CPU 202, cause the computing device 102 to receive and analyze transaction data.

Figure 3:
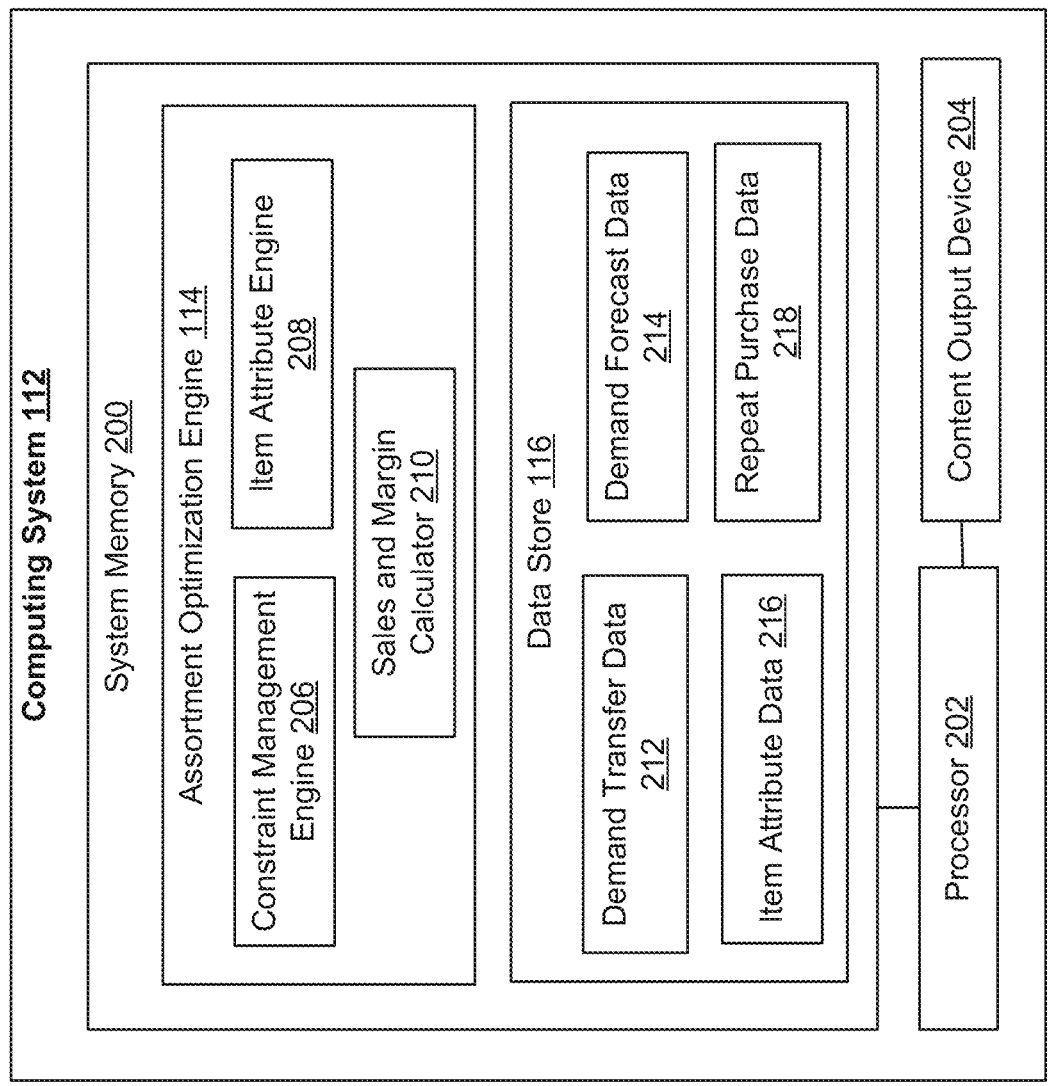
FIG. 3 illustrates an example block diagram of a computing system useable in the context of FIG. 1.
Figure 4:
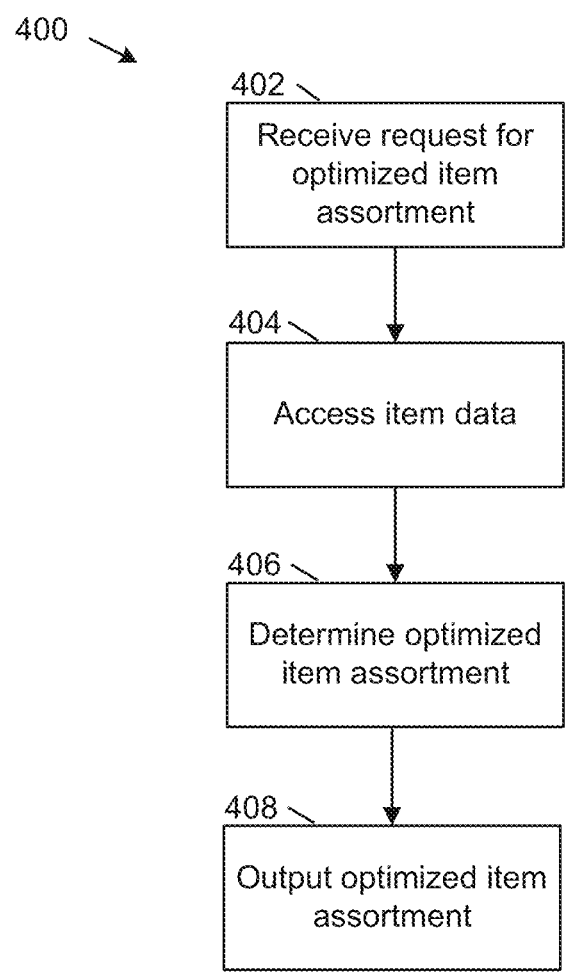
FIG. 4 illustrates an example method of optimizing an item assortment performed by some embodiments of the system of FIG. 1.

FIG. 3 illustrates a more detailed schematic diagram of the computing system 112 of FIG. 1. In the embodiment shown, the computing system 112 includes at least a system memory 200, operatively connected to a processor 202. The computing system 112 also includes a content output device 204, also operatively connected to the processor 202 and system memory 200.

In the example embodiment shown, the system memory 200 includes an assortment optimization engine 114. The assortment optimization engine 114 includes a constraint management engine 206, an item attribute engine 208, and a sales and margin calculator 210. The various engines generally are implemented in software modules stored in the system memory 200, and are implemented as discussed in further detail below. The assortment optimization engine 114 accesses data from the data store 116. In the example illustrated in FIG. 3, the data store 116 is part of the system memory 200. In some embodiments the data store 116 can be an external data store or multiple external data sources. The data store 116 includes demand transfer data 212, demand forecast data 214, item attribute data 216, and repeat purchase data 218. There may be greater or fewer types of data included in the data store 116. The data is further discussed below.

In example implementations, the item assortment input can be initialized with the current assortment of items within the category or group. Another input is the number of unique items that the user desires to have in that particular assortment. It could be the same number of items, more items, or fewer items. The unique items may be represented as stock keeping units or SKU's, which are assigned to each distinct type of item for sale. For example, a starting item assortment could include 56 unique items having 56 unique SKU's for different baby clothing items. The item assortment is not concerned with how many of each unique item are stocked, but rather with how many unique items are being carried by the retailer. So in this example, there could be 500 items stocked overall in baby clothing, but there are only 56 unique types of items in that category. In some embodiments, the current assortment can be applied to a single store, or to a plurality of similarly-situated stores within a retail enterprise.

The constraint management engine 206 is configured to apply constraints selected by a user to an item assortment. Constraints include rules and goals. The constraint management engine 206 receives an input of an optimization goal for a new item assortment. In some embodiments the goal is a balance of increasing sales and margins. The constraint management engine 206 also receives inputs of rules. The rules include lock in rules, lock out rules, and item attribute rules specified by the user.

The user U may select one or more constraints for the assortment optimizer to apply to the item assortment. The user U can input or select the constraints through the computing device 102. Multiple constraints can be selected at once. However, it is preferable that 2-5 constraints are applied at a time in order to produce the best options for assortment optimization. Selecting too many constraints can limit the assortment optimizer to the extent that no assortment would meet the requirements of the constraints at all.

In some example implementations, constraints can be defined by the user to customize the assortment. Constraints may also include legal regulations that the retail entity is required to abide by. One such regulation could relate to participation in the Women, Infants & Children (WIC) program. In order to comply, the store must carry particular grocery items. A WIC rule would lock in particular items that are required to be carried by the store. In some embodiments, some products would be interchangeable to meet these requirements and could be substituted in the assortment. Other rules may require a predetermined percentage of items in an assortment be an "owned brand" item, or requiring that, in a given iteration of the assortment optimization, a predetermined maximum percentage of products can change, thereby providing some level of product stocking reliability for customers of a particular store.

Constraints can also refer to distribution regulations. Some products can only be sold in particular jurisdictions. Items that are banned will be locked out of the assortment.

Some items can be locked into the assortment by the user. The user may wish to lock in items because of contractual obligations to sell particular products, a desire to sell store-branded products, seasonal items, or new items. These items will remain in the assortment even if they do not meet other constraints. For example, a seasonal item may not have high overall sales or profits, but the retail entity wishes to offer it for sale for the season.

In addition to rigid lock-in or lock-out constraints, the user can define constraints based on a percentage of the overall assortment. For example, the user could implement a constraint that at least 10% of the assortment must be premium products and at least 10% of the assortment must be value products.

Another constraint could limit the amount of overall change that can occur to the item assortment at one time. For example, a constraint could limit the percentage of change to the item assortment to 5%. A constraint could also require that at least 5% of the assortment be exchanged for new items. A retail entity may implement such constraints in an effort to not disrupt the overall assortment too much at once. Changing inventory in a retail entity incurs operational costs. If too much of the inventory is changed at once the benefits of the optimized assortment may be outweighed by the costs of implementing the optimized assortment.

In some instances, the constraint could change the overall number of items in the assortment. Generally, because space is finite for product display, a selected number of products or Stock Keeping Units (SKUs) may be held constant as a constraint on assortment selection. However, in example instances, a constraint could dictate that the total number of items or SKU's be reduced by 2% in order to save space. Alternatively, if additional space is available, the constraint could dictate that the total number of items or SKU's be increased by 1%. These constraints could also be expressed by number of items instead of a percentage. For example, a constraint could be to add 20 new items to an assortment.

Other constraints can relate to repeat sales scores, overall sales per item, profits per item, item category, item distribution (variety), cost distribution, or other factors that may be desirable to obtain a diverse but profitable assortment.

The constraints may be ranked in order of importance. In some instances, not all of the constraints can be satisfied. By ranking the constraints, the user U can be ensured that the most important constraints will be met. For example, compliance with legal and regulatory rules may be a top priority. Changing the overall number of SKU's or limiting the percentage of change in the item assortment may be the next most important constraint. Then constraints such as repeat purchase score and having a particular percentage of items within a particular category may be least important. The overall goal of increasing sales is still a consideration, but that comes after the other constraints are met. If a constraint is found to be infeasible, it will be skipped or modified. Some constraints can be labeled as mandatory while others are considered non-mandatory. Mandatory constraints must be followed in optimizing an item assortment. For example, following legal regulations could be a mandatory constraint. Reducing the number of items in an assortment may be important, but not at the expense of removing required WIC items from the assortment.

The item attribute engine 208 is configured to access item data relating to items in the item assortment and item universe. The item attribute engine 208 compares the item data with the rules to determine which items within the item universe conform to the rules and are eligible for inclusion in the assortment. Item attributes are accessed from the data store 116.

The margin and sales calculator 210 analyzes the items individually and as a group to determine which combination of items results in the highest margins, sales, or combination. The margin and sales calculator 210 relies on data such as demand transfer data and demand forecasting data to determine which items to include in the assortment to achieve the specified goal.

The data store 116 includes demand transfer data 212, demand forecast data 214, item attribute data 216, and guest score data 218. Additional sources of item data may also be included. In the embodiment shown in FIG. 3, the data store 116 is shown as being part of the system memory 200. In some embodiments, one or more data types may be stored in external databases.

The demand transfer data 212 includes information relating to customer's willingness to substitute a desired item with an alternative item when the desired item is not available. Scores are calculated for pairs of items to indicate the level of substitutability. Such demand transfer data can inform the extent to which similar items, from a demand perspective, are stocked concurrently. One example system for assessing demand transfer is disclosed in U.S. patent application Ser. No. 15/582,244, and entitled "Method and System of Managing Item Assortment Based on Demand Transfer", the disclosure of which is hereby incorporated by reference in its entirety.

The demand forecast data 214 includes information about projected sales for a particular item over a defined period of time. A demand forecasting engine can supply projections for the expected sales of particular items. In example embodiments, the demand forecast data 214 can be received for a particular or configurable period of time (e.g., daily, weekly, monthly, etc.). Various demand forecasting tools can be used.

Item attribute data 216 includes information about each item and how it is categorized. For example, relevant item attributes could include whether the item is WIC compliant, whether the item is a store-owned brand, whether the item is new, whether the item is a top seller, which category the item belongs to, etc. The item attribute data 216 is utilized to determine which items comply with item attribute rules.

Repeat purchase data 218 includes information about how often the same customers buy the same products. The repeat purchase data can take a variety of forms. In some embodiments, repeat purchase data 218 includes an indication of average frequency of purchasing the product by a given customer; in other examples, the repeat purchase data 218 can include a probability value of repurchase by a same customer. Other representations could be used as well.

Referring now to FIGS. 4, 5, 9, and 11, flowcharts of methods that can be performed using the systems of FIGS. 1-3 are described. The methods described herein present possible operations that can be performed using these systems in a general case, while the detailed examples of FIGS. 6-8, 10, and 12 present illustrations of how these methods can be implemented to optimize an assortment.

At operation 402, a request is received for an optimized item assortment. In some embodiments, the request is received at a computing system, such as the computing system 112 of FIG. 1, from a computing device such as the computing device 102 of FIG. 1. The request includes at least a selection of an initial item assortment, and constraints for the optimization of the assortment. In some embodiments, an item universe from which new items can be selected for the assortment. Other times the item universe is selected by default. Operation 402 is further described with respect to FIGS. 5-8.

At operation 404, item data is accessed for the items in the assortment and the item universe. The data that needs to be accessed may vary depending on the selected constraints for the optimized assortment. Various types of data may be required, which are described above. The item data is accessed from one or more data stores or databases which may be housed in a computing system such as the computing system 112 or in external databases such as the databases 120, 122 depicted in FIG. 1. Operation 404 is further described with respect to FIGS. 9-10.

At operation 406, an optimized item assortment is determined based on the selected initial item assortment, item universe, constraints, and item data. Items within the initial item assortment and item universe are analyzed to identify attributes of those items. Items within the initial item assortment are replaced with items within the item universe to conform to the constraints. Operation 406 is further described with respect to FIGS. 11-12.

At operation 408, the optimized item assortment is communicated from the assortment optimization engine 114 to the computing device 102. The optimized item assortment can be output in many different formats depending on the eventual use of the information. In some embodiments, the optimized item assortment may be utilized to create a planogram for a retail store. For example, an optimized item assortment can correspond to an ordered list of products (by SKU) as to the popularity or profitability of such an item; in such an arrangement, that ordered list can be provided to planogram software for deriving an item layout for a store or portion of a store (e.g., an aisle or department). Such planogram software may prioritize locations of items based on, for example, item size, popularity, profitability, or other factors.

Figure 5:
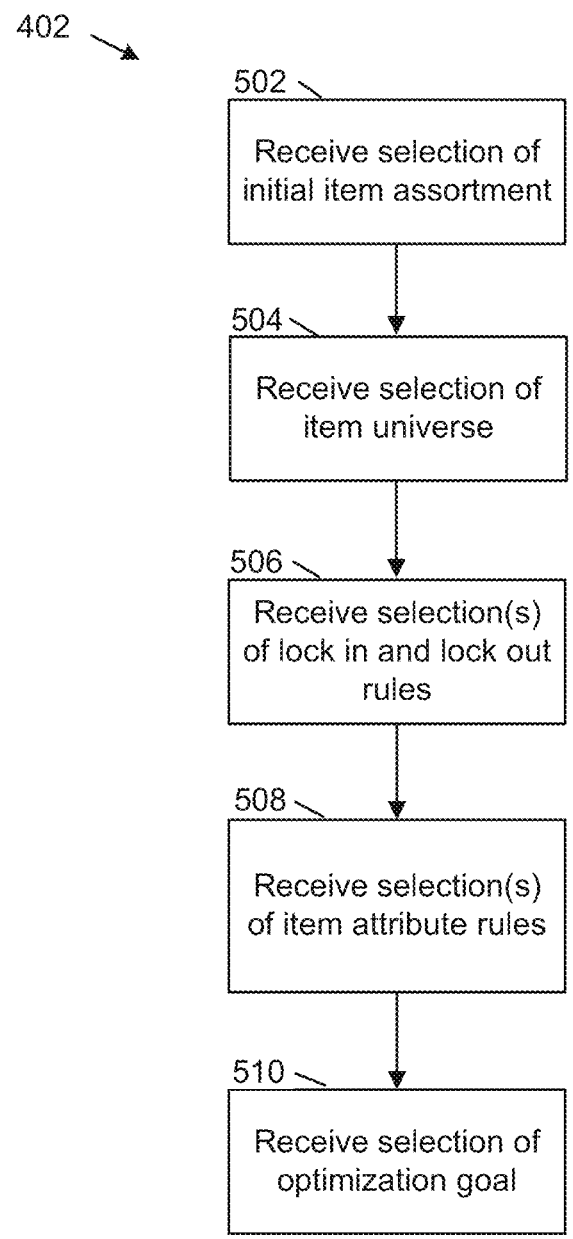
FIG. 5 illustrates an example method of receiving a request for an optimized item assortment performed by embodiments of the system of FIG. 1.
Figure 8:
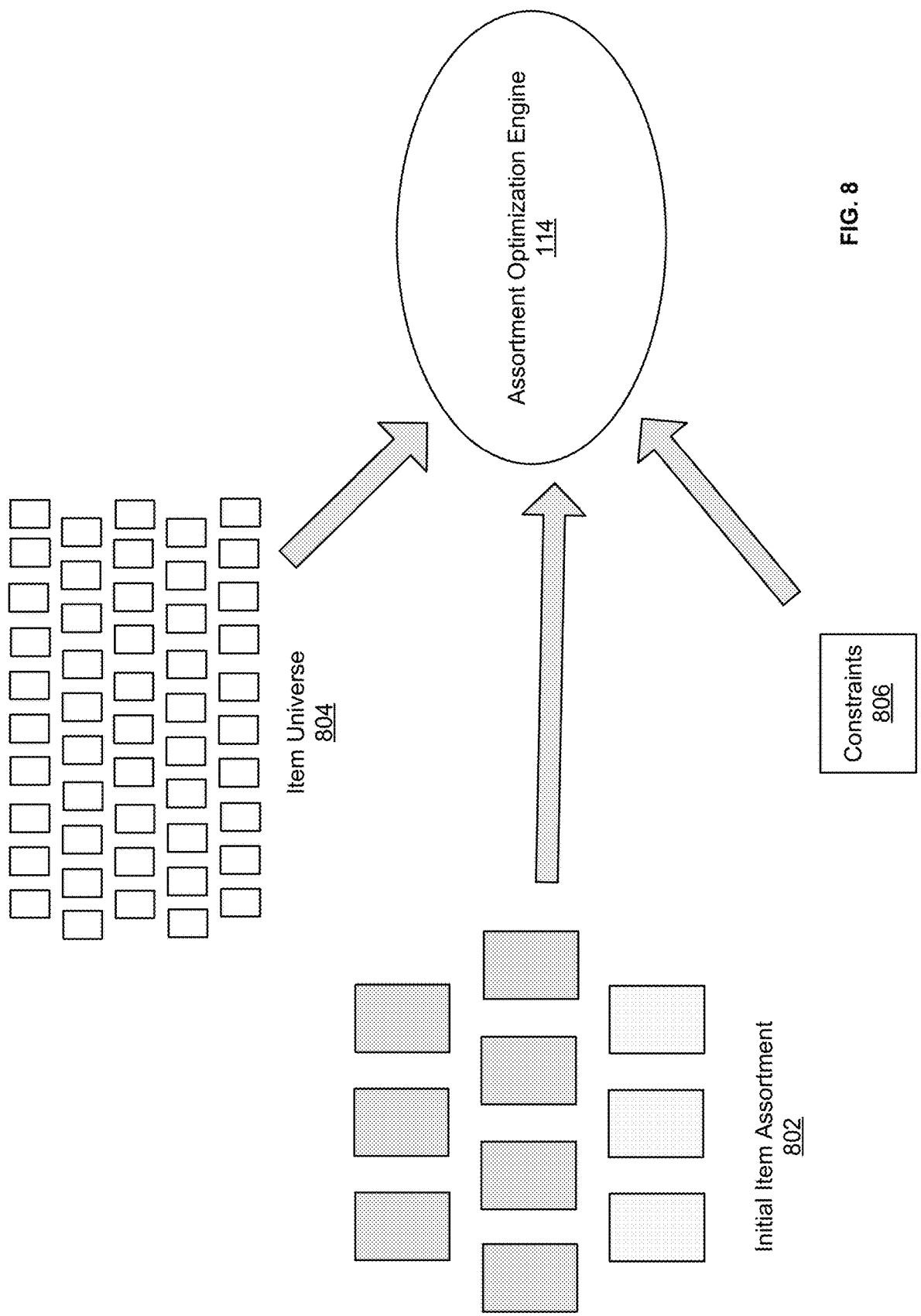
FIG. 8 illustrates a schematic diagram representing the method of FIG. 5.

FIG. 5 illustrates a more detailed method 402 of receiving a request for an optimized item assortment. This method 402 may be performed by the computing system 112 illustrated in FIGS. 1 and 3. The computing system 112 receives the request from a computing device such as the computing device 102 illustrated in FIGS. 1 and 2. The computing device 102 may be operated by a user U. In some embodiments, the user U inputs the request through a user interface, such as the user interface illustrated in FIGS. 6 and 7. A schematic diagram representing this method 402 is depicted in FIG. 8.

At operation 502, an initial item assortment is received. A user U may upload the initial item assortment to a computing device 102 to be communicated to the computing system 112 through a network 110. In some embodiments the initial item assortment is provided in a format that is readable by the computing system 112. In other embodiments, the computing system 112 converts the initial item assortment into an appropriate format upon receipt. For example, the initial item assortment may be identified by SKU number alone, but additional information regarding specific characteristics of the item or product may be required to optimize assortment (e.g., as received from item attribute service 150). These can include, for example, specific characteristics of the item (e.g., size, flavor, style) as well as current price, for purposes of determining a demand forecast for that item. The initial item assortment includes information identifying the different individual items within the assortment, the number of different individual items, and information about the category of items within the assortment. Greater or fewer types of identifying information may be communicated with the initial item assortment.

Figure 6:
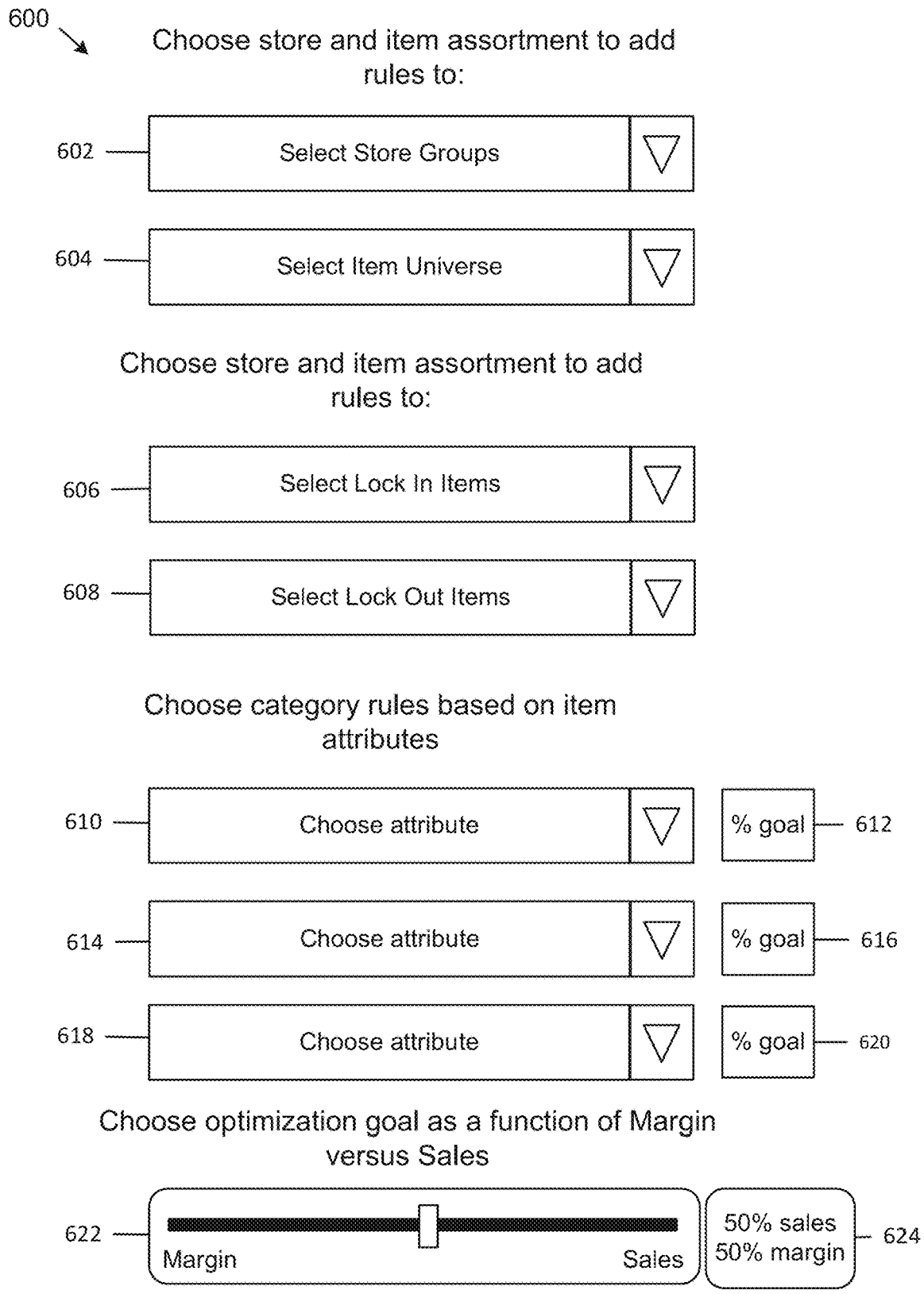
FIG. 6 illustrates an example user interface presented on embodiments of the computing device of FIG. 1.

In some embodiments, the initial item assortment is selected by a user U on a user interface presented on a computing device 102. An example user interface 600 is illustrated in FIG. 6. The user interface 600 features a number of drop-down menus and text fields in which a user can make selections to submit a request for an optimized item assortment. A user U can select an initial item assortment by making a selection with the store groups drop-down menu 602. In this example, various store groups are pre-populated in the store groups drop-down menu 602. For example, in FIG. 7, the store group that is selected is "Store #4367 Grocery Items." Selecting this store group as the initial item assortment selects the items that are currently being sold at store #4367 in the grocery category. The assortment of items is already recorded at the computing system 112 or at a remote site and is accessed by the computing device 102 or computing system 112 to determine the initial item assortment. This is just one example of how an initial item assortment may be selected. In other embodiments, the initial item assortment may be uploaded or otherwise input by the user U.

Returning to FIG. 5, at operation 504 a selection of an item universe is received. A user U may upload the item universe to a computing device 102 to be communicated to the computing system 112 through a network 110. In some embodiments the item universe is provided in a format that is readable by the computing system 112. In other embodiments, the computing system 112 converts the item universe into an appropriate format upon receipt. The item universe includes information identifying the different individual items within the universe and information about the category of items within the assortment. Greater or fewer types of identifying information may be communicated with the item universe. In some embodiments, the item universe is accessed from a data store within the computing device 102, within the computing system 112, or from an external database.

In some embodiments, the item universe is selected by a user U on a user interface presented on a computing device 102, such as the user interface 600 illustrated in FIG. 6. A user U can select an initial item assortment by making a selection on the item universe drop-down menu 604. In this example, various item universes are pre-populated in the store groups drop-down menu 604. For example, in FIG. 7, the item universe that is selected is "Grocery Items." Selecting this item universe selects all possible grocery items that the retailer could offer for sale. This is just one example of how an item universe may be selected.

Returning to FIG. 5, selections of lock in and lock out rules are received at operation 506. Lock in rules freeze items within the initial item assortment so that they cannot be removed or exchanged for new items. Lock out rules prevent particular items from being added to the initial item assortment. Many items that are locked in or out are done to comply with legal requirements or contractual obligations. In some embodiments, lock in and lock out rules are mandatory rules. For example, items that may need to be "locked in" include grocery items that qualify for the "WIC" (Women Infants Children) government program. Items such as baby formula or whole grain cereal would be locked into the assortment in order for the retail store to comply with the WIC program. Items that may need to be "locked out" include grocery items that are banned from being sold in a particular state. Items such as raw milk could be locked out of item assortments that are being prepared for retail stores in states that do not allow the retail sale of raw milk.

In the example user interface illustrated in FIG. 6, locked in items can be selected with the lock in items drop-down menu 606. Locked out items can be selected with the lock out items drop-down menu 608. In the example of FIG. 7, the user U has selected WIC items in the lock in items drop-down menu 606. No selection was made with the lock out items drop-down menu 608. In some embodiments more than one type of item can be locked in or out.

At operation 508 of the method 402 in FIG. 5, selections of item attribute rules are received. Selections made at a computing device 102 are communicated to the computing system 112 to apply various constraints to the item assortment optimization. Constraints include both rules and goals. In this step, rules are selected by a user U. The rules are based on attributes of the items in the initial item assortment and item universe previously selected by the user U. Such item attributes can include a product category or subcategory, sales history, demand transfer scores with various pairing of items, demand forecasts, the brand of the item, repeat purchase score, whether the item is seasonal, whether the item is new, and the like.

In the example user interface 600 illustrated in FIG. 6, multiple attribute drop-down menus 610, 614, 618 are displayed. The user U can select one or more rules relating to attributes of the items in the assortment. In the embodiment of FIG. 6, there are also percentage text fields 612, 616, 620 in which the user U can specify a percentage of the total item assortment that the user U wishes the attribute to apply to. In some embodiments, the user U does not have to supply a percentage and the rule will apply to all items in the assortment.

For example, as seen in FIG. 6, a user U can select one or more store groups, with each store group corresponding to one or more stores.

In the example of FIG. 7, "Store-owned Brand" is selected at a first attribute drop-down menu 610. 10% has been entered in the percentage text field 612 corresponding to that attribute, indicating that the user would like at least 10% of the item assortment to include items that are store-owned brands. "Initial Item Assortment" is selected at a second attribute drop-down menu 614 and the corresponding percentage text field 616 reads "70%." The user has thus indicated that the optimized item assortment should include at least 70% of the same items that were included in the initial item assortment.

Finally, returning to FIG. 5, a selection of an optimization goal is received in operation 510. An optimization goal is the overall goal of adjusting the item assortment. Such goals can include increasing profit margins on sales of items, increasing overall sales numbers, and the like.

In the example user interface 600 of FIG. 6, a goal slider 622 is displayed that allows a user U to select a balance of sales and margins as the goal for the optimized item assortment. Other selectors are possible such as toggle switches, drop-down menus, or text fields. The optimization goal may also be represented as a ranking of goals or as a selection of a singular goal. A goal indicator 624 shows the selected percentages of sales and margins. In FIG. 6, the default balance of sales and margins for the goal is 50/50. Other values could be selected or set as default as well.

In FIG. 7, the goal slider 622 has been adjusted to favor sales. The goal indicator 624 indicates that the optimization goal has been set to a balance of 80% sales and 20% margin.

The initial item assortment will be modified to accommodate both the rules set by the user and the goal selected by the user. In instances where it is not possible to accommodate both, the rules can be emphasized to take priority over the optimization goal. Locked in and locked items may take priority over other rules and goals. In some embodiments, the user specifies the ranking of the rules.

FIG. 8 illustrates a diagrammatic representation of the method 402 of FIG. 5. An initial item assortment 802, item universe 804, and constraints 806 are input into the assortment optimization engine 114. Using the example of FIG. 7, the initial item assortment 802 would include grocery items for store #4367. The item universe 804 would include other grocery items that could be sold in the store #4367. The constraints 806 are the rules and goals input by the user U into the user interface 600.

Figure 9:
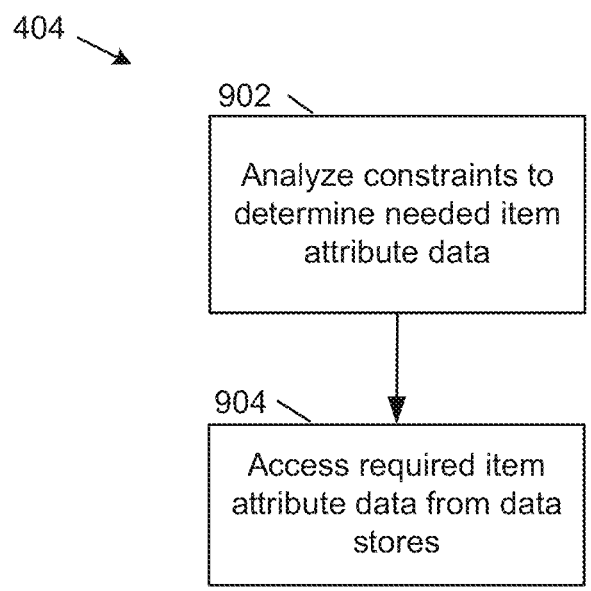
FIG. 9 illustrates an example method of accessing item data performed by embodiments of the system of FIG. 1.

FIG. 9 illustrates an example method 404 of accessing item data. In order to implement the constraints input by the user U, attributes of the items must be identified and compared. At operation 902, the constraints are analyzed to determine the item attribute data needed to optimize the item assortment. The constraint management engine 206 of the assortment optimization engine 114 determines which item attributes are applicable to the selected constraints. Using the example constraints of FIG. 7, the assortment optimization engine 114 needs to determine which items are WIC compliant, which have a store-owned brand, and what the margin and sales for those items are.

Figure 10:
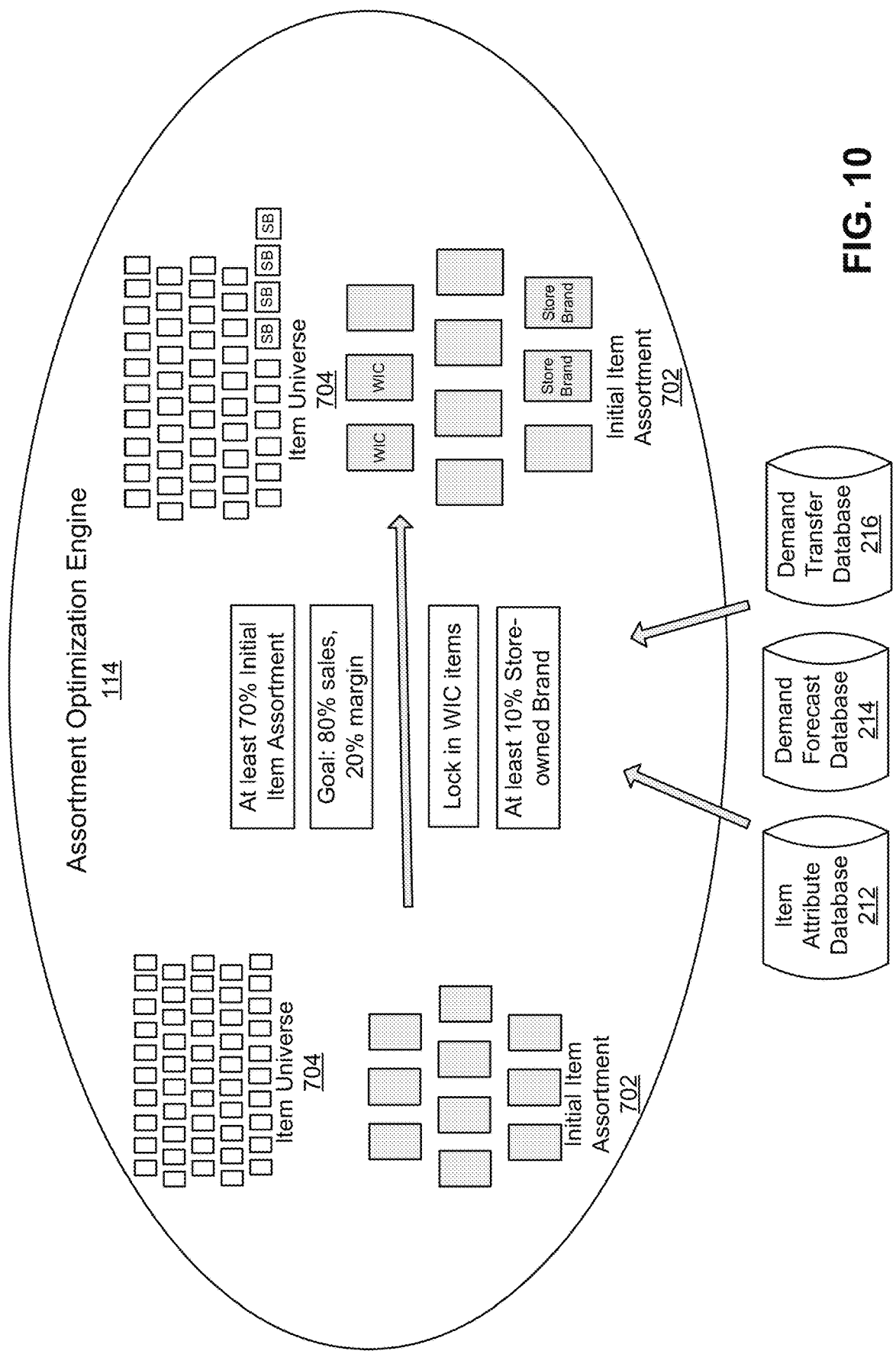
FIG. 10 illustrates a schematic diagram representing the method of FIG. 9.

At operation 904, the required item attribute data is accessed from one or more databases or data stores. The item attribute engine 208 receives the item attribute data. FIG. 10 illustrates a schematic diagram of the method 404. The assortment optimization engine 114 is shown receiving data from three different databases. Item attribute data is received from the item attribute database 212. Item attribute data includes characteristics of the items such as the category of item, whether the item is WIC compliant, whether the item is banned in a particular jurisdiction, or the item's brand. The demand forecast database 214 stores information about the projected sales of the items for a given period of time. The demand transfer database 216 stores information about the likelihood that one item is substitutable for another. After the required item attribute data is accessed, it is associated with the items by the item attribute engine 208.

Figure 11:
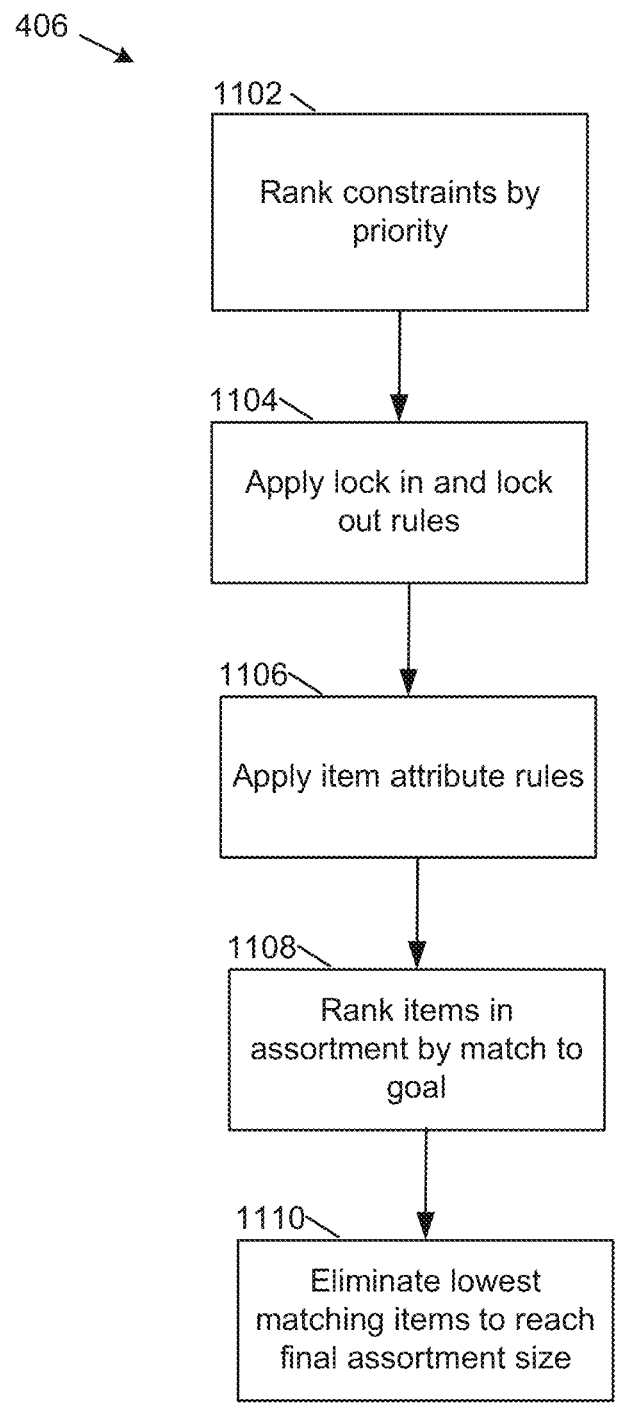
FIG. 11 illustrates an example method of determining an optimized item assortment performed by embodiments of the system of FIG. 1.
Figure 12:
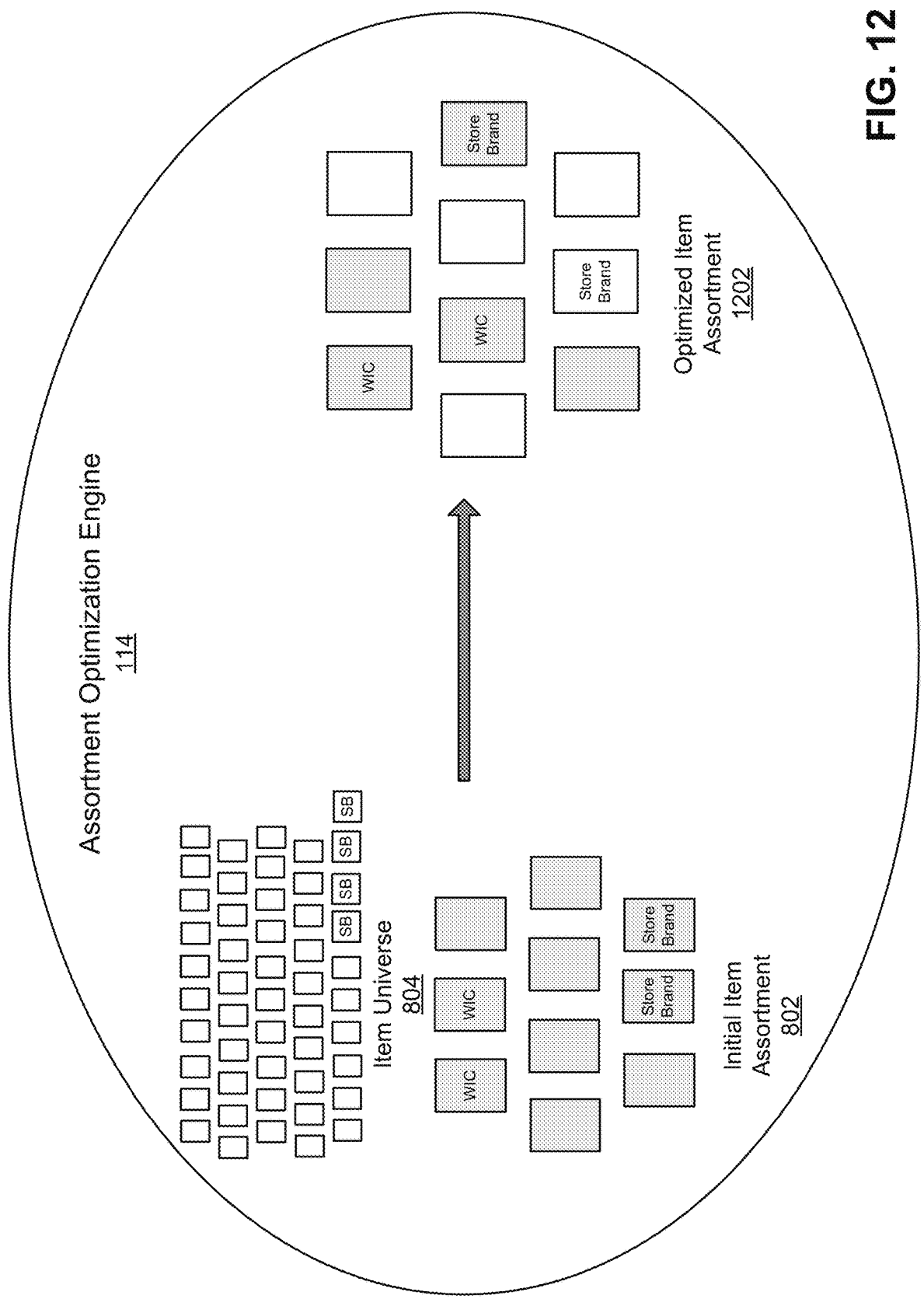
FIG. 12 illustrates a schematic diagram representing the method of FIG. 11.

FIG. 11 illustrates an example method 406 of determining an optimized item assortment. In some embodiments, the method 406 is performed by the assortment optimization engine 114 illustrated in FIGS. 1 and 3. The assortment optimization engine 114 utilizes the initial item assortment 802, item universe 804, and constraints 806 that are received from the computing device 102 to calculate an optimized item assortment. A schematic diagram of this method 406 is illustrated in FIG. 12

At operation 1102 of the method 406, the constraints are ranked by priority. In some embodiments, some or all of the constraints are ranked by default by the constraint management engine 206. For example, locked in and locked out items take the highest priority. Optimization goals take lowest priority. User selected item attribute rules fall in between. In some embodiments, the user can select the ranking of priority for the chosen constraints. In the event that not all of the constraints can be met for a particular item assortment, the constraints that are ranked higher take priority over those that are ranked lower. If not enough items meet all of the optimization constraints selected in the example user interface of FIG. 7, some of the items that are included in the optimized item assortment may not meet all of the item attribute rules or optimization goals. For instance, all of the items in the optimized assortment may comply with the lock in rule and the item attribute rules, but the optimization goal of 80% sales and 20% margin may be not met in order to comply with the other constraints. Note that operations 1104, 1106, and 1108 of the method 406 could be in any order depending on the outcome of operation 1102.

At operation 1104, the lock in and lock out rules are applied to the initial item assortment. Lock in rules prevent items having particular attributes from being removed from the initial assortment. Examples of lock in rules may include WIC items, seasonal items appropriate for the season (e.g. pumpkin space flavored items in fall), regional items, items that must be offered for sale to meet contractual obligations, and the like. Lock out rules prevent items having particular attributes from being added to the initial assortment. Examples of lock out rules may include hazardous items, items banned by governmental regulations, seasonal items that are not appropriate for the season (e.g. pumpkin spice flavored items in spring), items that violate contractual obligations, and the like. In some embodiments, lock in rules and lock out rules take priority over other constraints. In some embodiments, if there is more than one lock in or lock out rule, the user can specify the order of priority.

At operation 1106, item attribute rules are applied to the initial item assortment. Item attribute rules are user defined rules based on attributes of the items in the assortment. Such item attributes can include whether an item is new or existed in the initial item assortment, the brand of the item, the product category, a demand transfer score of an item, whether an item is seasonal, and the like. The item attribute engine 208 of the assortment optimization engine 114 utilizes the item attribute data received from one or more databases to determine which items in the initial item assortment and the selected item universe comply with the selected rules. In some embodiments the user can rank the priority of the item attribute rules if there is more than one. This ranking is implemented by the constraint management engine 206.

In some embodiments, such as that displayed in FIG. 7, the user can specify an amount of the assortment that an item attribute should apply to. In the user interface 600 of FIG. 7, the user has selected the item attribute rules of store-owned brand and initial item assortment in the drop-down menus 610, 614. In addition, a percentage of the assortment is specified in the text fields 612, 616 indicating that 10% of the assortment should be store-owned brand items and 70% of the assortment should be items that were in the initial item assortment.

At operation 1108, items in the initial assortment are ranked by how well they match the optimization goal selected by the user. In some embodiments, the initial item assortment may already be modified based on the user selected rules. The items in the assortment are analyzed to determine the item attributes that are applicable to the optimization goal. In the example of FIG. 7, the optimization goal is 80% sales and 20% margin. This indicates that the goal of the assortment optimization is mostly to increase overall sales, and that increasing margins is a less important goal. The sales and margin calculator 210 of the assortment optimization engine 114 determines how each item will affect the sales and margins of a particular retailer for a given period of time. Then the items are ranked by how well they will help the assortment achieve the selected goal. Demand forecasting data and demand transfer data are important in determining an optimal assortment to achieve the specified goal; as such, use of accurate demand forecasts and accurate assessment of demand transfer is preferred. Example implementations of demand forecasts and demand transfer analysis are described above.

At operation 1110, the items that match the rules and goals the least are eliminated from the item assortment in order to achieve the desired assortment size. In some embodiments the optimized item assortment is the same size as the initial item assortment. In other embodiments the user may specify that the item assortment should increase or decrease in size. The size of the item assortment may be restricted based on amount of storage space for items or other considerations. This size restriction can be set, for example, by the user U, by selection of a particular store or store group, or otherwise selected.

FIG. 12 is a schematic diagram illustrating the method 406 of FIG. 11. Here the assortment optimization engine 114 is applying the constraints to the initial item assortment 802 to arrive at an optimized item assortment 1202. Items within the item universe 804 are analyzed the same as the items in the initial item assortment 802 to determine if they comply with the rules and goals specified by the user. When items from the item universe 804 are a better fit with the constraints than items within the initial item assortment 802, the items from the item universe 804 replace items from the initial item assortment 802. In some instances, items may be removed from the initial item assortment 802 without being replaced if the overall assortment size is decreasing. Items may be added to the initial item assortment 802 from the item universe 804 without removing items from the initial item assortment 802 if the overall assortment size is increasing.

Referring back to FIG. 3, additional details regarding the assortment optimization engine 114 are provided, according to a further example embodiment of the present disclosure. Generally, the assortment optimization engine 114 can be implemented using any of a variety of data models useable to estimate, based on item attributes, item demand, and demand transfer among items, as well as attributes of the area in which the items are to be located, and optimal assortment to be included at a particular location or group of locations within an enterprise.

According to this embodiment, the margin and sales calculator 210 operates to apply the constraints to the available items to determine an assortment of items that maximize sales and/or margins. The following formulas provide an example of the calculations that can be performed with an example set of constraints for the goal of maximizing total sales dollars per week.

In one possible example, the following formula calculates an assortment for a retail store to maximize total sales dollars per week, representing a sum of sales s multiplied by price x for each item i in an item assortment:

$$\sum_i s_i x_i$$

Additional demand transfer dollars per week are calculated to account for items not included in assortment. This equation calculates another value that is added to the value calculated above, which represents a sum over items included and those items not included in an item assortment, and a change in item sales over time:

$$\sum_i \sum_j dt_{ij} s_i x_j (1 - x_i)$$

In the above equations, i is an item, so the calculations are performed for each individual item in the item universe. $s_i$ is the average forecasted sales dollars per week of item i during a selected transition start and end date time period (defined as average forecasted units*average retail price). $x_i$ is a variable that has the value of 1 if item i is selected in the recommended assortment, or the value of 0 if it is not selected. Similarly, $x_j$ has a value of 1 if item j is selected, and a value of 0 if not selected. $dt_{ij}$ is the proportion of item i's sales to transfer to item j when i is taken out of the assortment but j is kept in the assortment.

In some aspects of the present disclosure, mandatory rules are applied to the item assortment. The following equations incorporate calculations for each mandatory rule as described.

For a rule that the recommended item count should not exceed given maximum SKU count, the calculation ensures that the optimized item assortment does not have more items than the selected maximum entered by a user. The following equation applies where max_sku_cnt is the maximum number of items to have in the optimized assortment.

$$\sum_i x_i \leq \text{max\_sku\_cnt}$$

Another mandatory rule dictates that items with an adjusted purchase repeat score above the purchase repeat score threshold should be included in the optimized assortment (if the item is not locked out). In the following equation $pr_i$ is the adjusted purchase repeat score of item i. $prs_{threshold}$ is the repeat purchase score threshold value to include an item in the assortment.

$$x_i \geq pr_i - prs_{threshold} \forall i \notin \text{LockedOut}(i)$$

As noted above, in some embodiments, mandatory lock in and lock out rules are applied to the assortment to ensure that particular items are included or excluded from the optimized item assortment. In such embodiments, lock in rules are applied to the calculation with the following equation:

$$x_i = 1 \forall i \in \text{LockedIn}(i)$$

Lock out rules are applied to the calculation with the following equation:

$$x_i = 0 \forall i \in \text{LockedOut}(i)$$

Additional rules can be applied to the item assortment in addition to mandatory rules. These rules relate to item attributes and are specified by the user. In this example there are two additional rules that are applied to the assortment if possible. The first rule dictates that the optimized item assortment should include at least a particular amount of items from the initial item assortment. In the example equation below, the value of min_preast_item_cnt_to_keep is the minimum number of items to keep from the previous assortment. If the value is given as a percentage, the number of items is calculated as follows: number of items in initial item assortment*(100−x) %), where x is the specified percentage. The equation for this rule is provided as:

$$\sum_{i \in PreAssortmentInCart(i)} x_i \geq \text{min\_preast\_item\_cnt\_to\_keep}$$

Another rule dictates that the optimized item assortment should include at least a certain amount of items that are a store owned brand. In the example equation below, the value of min_cnt_own_brnd_in_rec is the minimum number of items that must be of a store owned brand in the optimized assortment. If the value is given as a percentage, the number of items is calculated as follows: number of items in initial item assortment*(100−x) %), where x is the specified percentage. The equation for this rule is provided as:

$$\sum_{i \in OwnBrandInCart(i)} x_i \geq \text{min\_cnt\_own\_brnd\_in\_rec}$$

If rules relating to percentages of items are utilized, the values may result in fractions of items. For example, if the rule dictates that 10% of the assortment must be store owned brands and there are going to be 118 items in the optimized item assortment, 10% would be 11.8 items. Therefore the system will automatically round the number of items to 12 that should be store brands. If the rules for percentages of items cannot be met while also meeting mandatory rules like lock in or lock out rules, the percentages can be adjusted until they fit the assortment. For example, if 10% store brand cannot be achieved in an item assortment while also complying with lock in and lock out rules, the percentage is automatically adjusted to 9% or 8%.

Various controls can be applied to the assortment depending on the type of rule. For mandatory rules, the constraints must be applied to the assortment no matter what. If it is infeasible to produce an assortment with that rule, the system will produce a message indicating that there are no recommendations for optimizing the item assortment. The user may be prompted to adjust the constraints applied to the assortment. For other rules, the system could run the assortment optimization by skipping the rule if the assortment cannot be optimized with the rule in place. Alternatively, the system could issue a message to the user to indicate that the rule is infeasible and ask whether to skip the rule or if the user wishes to edit the constraints.

Accordingly, based on the priorities set by a user, one or more of the equations may be applied and weighted to achieve an item prioritization for each item, and an item selection can be calculated as being a preselected set (e.g., top predetermined number) of items, as adjusted by item constraints and/or rules.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for optimizing an assortment of items, the system comprising:
  a computing system comprising an assortment optimization application stored in memory and executable thereon; the assortment optimization application causing the computing system, when executed, to:
  receive a request to optimize an item assortment from a user computing device having an interactive user interface, the request including a selection, received through the interactive user interface, of one or more assortments from among a plurality of selectable assortments, and at least one constraining rule from among one or more of:
    maximizing a number of sales dollars per week;
    determining additional demand transfer dollars per week for items not included in the current assortment; and
    applying one or more lock-in or lock-out rules;
  and the request defining a current assortment for at least one store, wherein the current assortment is finite based on a predetermined resource constraint;
    based on the request including the selections received through the interactive user interface, obtain item information, demand forecast information, and demand transferability information for a plurality of items in an item database stored in the memory via one or more application programming interfaces connected to external data sources, wherein the external data sources are continuously updated automatically based on changes in item information, demand forecast information, and demand transferability information;
    in response to receiving the request, apply at least one multivariate optimization analysis to the one or more selected assortments received in the request through the interactive user interface to generate an optimized assortment, the at least one multivariate optimization analysis including maintaining a predetermined number of items to keep from the current assortment in the optimized assortment, wherein the predetermined number of items to keep from the current assortment in the optimized assortment is maintained via the following equation:

$$\sum_{i \in PreAssortmentInCart(i)} x_i \geq min\_preast\_item\_cnt\_to\_keep$$

wherein i corresponds to each item in the current assortment, and x represents a number of items to maintain from the current assortment in the optimized assortment, and wherein the optimization analysis further includes applying the at least one selected constraining rule received in the request through the interactive user interface;
    wherein the multivariate optimization analysis further includes an automated feedback data flow that continuously accesses the external data sources and receives updates based on changes to at least one of item information, demand forecast information, or demand transferability information for the plurality of items in the item database, and based on receiving an update from the automated feedback data flow, updating the current assortment to generate the optimized assortment by substituting an item from the current assortment with a different item from the plurality of items in the item database, adding an item from the plurality of items in the item database to the current assortment, or removing an item from the current item assortment;
    return the optimized assortment to the user computing device, wherein the automated feedback data flow is configured to automatically refresh the optimized assortment based on changes to at least one of item information, demand forecast information, or demand transferability information for the items in the optimized assortment, and wherein optimized assortment is an ordered list based on the at least one constraining rule and the update from the automated feedback dataflow, and finiteness of the current assortment is maintained in the optimized assortment based on the predetermined resource constraint; and
    store the optimized assortment in the memory for use as the current assortment in a subsequent request.

2. The system of claim 1, further comprising receiving, from the user computing device, a subsequent request in which the optimized assortment is used as the current assortment in the request.

3. The system of claim 1, wherein the additional demand transfer dollars per week for items not included in the current assortment is calculated based on a sum over items included and those not included in an item assortment, and a change in item sales over time.

4. The system of claim 1, wherein the one or more lock-in or lock-out rules includes a plurality of required items to be included in the optimized assortment.

5. The system of claim 1, wherein the optimization analysis further includes maintaining a predetermined level of store brand items in the optimized assortment.

6. The system of claim 5, wherein the predetermined level of store brand items is maintained via the following equation:

$$\sum_{i \in OwnBrandInCart(i)} x_i \geq min\_cnt\_own\_brnd\_in\_rec$$

wherein i corresponds to each item, and x represents a summed number of store brand items included in the assortment.

7. The system of claim 1, further comprising a tools platform communicatively interposed between the computing system and the network, the tools platform including:
an interface that receives requests for optimized assortments from a plurality of user computing devices, receives selections made through interactive user interfaces of the plurality of user computing devices, and receive updates on requests being executed by the computing system;
a trigger service that controls submission of requests to the assortment optimization application to be fulfilled based on an availability of bandwidth at the computing system as indicated by the received updates on requests being executed, and that makes calls to the computing system with required workflow configurations to complete the requests when bandwidth is available; and
a monitoring service that provides dynamic updates to the plurality of user computing devices on the status of the requests based on the status of submission and execution of the requests, and that communicates results of the optimization analysis to the interactive user interfaces of the user computing devices as the results are received and refreshed by the automated feedback data flow.

8. The system of claim 1, wherein the optimization analysis performs a weighting of a plurality of factors in generating the optimized assortment, the factors including sales maximization and margin maximization.

9. The system of claim 1, wherein the at least one constraining rule runs counter to item demand.

10. The system of claim 1, wherein the optimization analysis further includes performing a balance of at least two optimization goals, wherein the balance between the at least two optimization goals is selected by movement of a single selector on the interactive user interface and the balance selected by the single selector prioritizes the at least two optimization goals for use in the multivariate optimization analysis.

11. The system of claim 1, wherein the selection of one or more assortments from among a plurality of selectable assortments includes a store or group of stores, and an item universe within the selected store or group of stores.

12. A method of optimizing an assortment of items, the method comprising:
receiving a request to optimize an item assortment from a user computing device having an interactive user interface, the request including a selection, received through the interactive user interface, of one or more assortments from among a plurality of selectable assortments, and at least one constraining rule from among one or more of:
maximizing a number of sales dollars per week;
determining additional demand transfer dollars per week for items not included in the current assortment; and
applying one or more lock-in or lock-out rules;
and the request defining a current assortment for at least one store, wherein the current assortment is finite based on a predetermined resource constraint;
based on the request including the selections received through the interactive user interface, obtaining item information, demand forecast information, and demand transferability information for a plurality of items in an item database stored in a memory via one or more application programming interfaces connected to external data sources, wherein the external data sources are continuously updated automatically based on changes in item information, demand forecast information, and demand transferability information;
in response to receiving the request, applying at least one multivariate optimization analysis to the one or more selected assortments received in the request through the interactive user interface to generate an optimized assortment, the at least one multivariate optimization analysis including maintaining a predetermined number of items to keep from the current assortment in the optimized assortment, wherein the predetermined number of items to keep from the current assortment in the optimized assortment is maintained via the following equation:

$$\sum_{i \in PreAssortmentInCart(i)} x_i \geq min\_preast\_item\_cnt\_to\_keep$$

wherein i corresponds to each item in the current assortment, and x represents a number of items to maintain from the current assortment in the optimized assortment, and wherein the multivariate optimization analysis further includes applying the at least one selected constraining rule received in the request through the interactive user interface;
wherein the multivariate optimization analysis further includes an automated feedback data flow that continuously accesses the external data sources and receives updates based on changes to at least one of item information, demand forecast information, or demand transferability information for the plurality of items in the item database, and based on receiving an update from the automated feedback data flow, updating the current assortment to generate the optimized assortment by substituting an item from the current assortment with a different item from the plurality of items in the item database, adding an item from the plurality of items in the item database to the current assortment, or removing an item from the current item assortment;
returning the optimized assortment to the user computing device, wherein the automated feedback data flow is configured to automatically refresh the optimized assortment based on changes to at least one of item information, demand forecast information, or demand transferability information for the items in the optimized assortment, and wherein optimized assortment is an ordered list based on the at least one constraining rule and the update from the automated feedback dataflow, and finiteness of the current assortment is maintained in the optimized assortment based on the predetermined resource constraint; and
storing the optimized assortment in the memory for use as the current assortment in a subsequent request.

13. The method of claim 12, wherein the optimization analysis performs a weighting of a plurality of factors in generating the optimized assortment.

14. The method of claim 13, wherein the factors include sales maximization and margin maximization.

15. The method of claim 12, wherein the optimization analysis ensures that fewer than a selected maximum number of recommended items are included in the optimized assortment.

16. The method of claim 15, wherein the number of recommended items included in the optimized assortment is defined by:

$$\sum_i x_i \leq \text{max\_sku\_cnt}$$

17. The method of claim 12, wherein the request defines a current assortment for each of a plurality of stores associated with a retail enterprise.

18. A system for optimizing an assortment of items, the system comprising:
a computing system comprising an assortment optimization application stored in memory and executable thereon; the assortment optimization application causing the computing system, when executed, to:
receive a request to optimize an item assortment from a user computing device having an interactive user interface remote from the computing system, the request including a selection, received through the interactive user interface, of one or more assortments from among a plurality of selectable assortments, and a plurality of constraining rules including:
maximizing a number of sales dollars per week;
determining additional demand transfer dollars per week for items not included in the current assortment; and
applying one or more lock-in or lock-out rules;
and the request defining a current assortment of items offered for sale and associated with at least one store, wherein the current assortment is finite based on a predetermined resource constraint;
based on the request including the selections received through the interactive user interface, obtain item information, demand forecast information, and demand transferability information specific to the at least one store for each of the items included in the current assortment via one or more application programming interfaces connected to external data sources, wherein the external data sources are continuously updated automatically based on changes in item information, demand forecast information, and demand transferability information;
in response to receiving the request, apply at least one multivariate optimization analysis to the one or more selected assortments received in the request through the interactive user interface to generate an optimized assortment, the at least one multivariate optimization analysis including applying the plurality of constraining rules received in the request through the interactive user interface;
and maintaining a predetermined number of items to keep from the current assortment in the optimized assortment, wherein the predetermined number of items to keep from the current assortment in the optimized assortment is maintained via the following equation:

$$\sum_{i \in PreAssortmentInCart(i)} x_i \geq \text{min\_preast\_item\_cnt\_to\_keep}$$

wherein i corresponds to each item in the current assortment, and x represents a number of items to maintain from the current assortment in the optimized assortment;
wherein the multivariate optimization analysis further includes an automated feedback data flow that continuously accesses the external data sources and receives updates based on changes to at least one of item information, demand forecast information, or demand transferability information for the plurality of items in the item database, and based on receiving an update from the automated feedback data flow, updating the current assortment to generate the optimized assortment by substituting an item from the current assortment with a different item from the plurality of items in the item database, adding an item from the plurality of items in the item database to the current assortment, or removing an item from the current item assortment;
return the optimized assortment to the user computing device, wherein the automated feedback data flow is configured to automatically refresh the optimized assortment based on changes to at least one of item information, demand forecast information, or demand transferability information for the items in the optimized assortment, and wherein optimized assortment is an ordered list based on the at least one constraining rule and the update from the automated feedback dataflow, and finiteness of the current assortment is maintained in the optimized assortment based on the predetermined resource constraints; and
store the optimized assortment in the memory for use as the current assortment in a subsequent request.

19. The system of claim 18, wherein the assortment optimization application is executed to generate an optimized assortment for each of a plurality of stores, and wherein two of more of the plurality of stores have different sets of rules applied to generate the optimized assortment.

20. The system of claim 18, wherein the plurality of constraining rules are ranked in order of importance and the highest ranking constraining rule is applied first.

21. The system of claim 18, wherein the optimization analysis performs a balance of sales maximization and margin maximization in generating the optimized assortment, the balance being selectable by a user.

* * * * *